Nov. 3, 1964 J. A. LINO 3,154,942

INFORMATION RETRIEVAL APPARATUS

Filed April 8, 1963

INVENTOR
JOSEPH A. LINO

BY George R. Douglas, Jr.
ATTORNEY

United States Patent Office 3,154,942
Patented Nov. 3, 1964

3,154,942

INFORMATION RETRIEVAL APPARATUS

Joseph A. Lino, 6656 10th Ave. N., St. Petersburg, Fla.

Filed Apr. 8, 1963, Ser. No. 271,110
3 Claims. (Cl. 73—156)

The invention relates to information retrieval apparatus for automatically selecting, retrieving, computing, comparing, and effecting other similar machine operations upon various forms of information that may be recorded on forms of media to accomplish an improvement in mechanized research. More particularly, the invention relates to an improved and simplified system for comparing the identity or non-identity of information on punched records.

Information retrieval is a term used in connection with indexing, filing, and finding documents according to systems of information which are designed to make the information which they contain speedily available as desired.

As has been reported in Fortune Magazine, September 1960, beginning on page 162, it appears that a simple and uniquely operable mechanical information retrieval system is desired for industrial as well as government use in retrieving information required for technical libraries, scientific and technical companies and organizations, as well as universities and research laboratories. The documented summation of human experience and opinion is expanding at such a prodigious rate that simple and expedient means for indexing, filing and finding such documents is an object of the present invention. Since the publication of the above Fortune Magazine reference, there has been no improvement in the art significant enough to simplify the cost and operation of information retrieval. Although traditional library methods of indexing and finding information are well known, there is no auxiliary information retrieval system able to cope with the abundance of literature and documents needed by researchers who are desirous of quickly being informed of available records and that with a great deal of accuracy.

It is therefore an object of the present invention to provide an improved information retrieval system that is inexpensive and available for accurately and quickly producing a selection of desired information from a record storage.

The invention also seeks to provide an information retrieval system that is adaptable to use in those present day informtaion retrieval and selection systems described in the above Fortune Magazine article, as well as in the Technical Note, No. 157, titled "Infomation Selection Systems Retrieving Replica Copies, a State of the Art Report," by Thomas C. Bagg and Mary Elizabeth Stevens, published by the National Bureau of Standards, December 31, 1961.

In the processing of data by electronic computers, as well as the theory of information retrieval, the following publications are of significant interest in propounding the problems and solutions that are generally used in information retrieval and storage systems:

Publication: "Theory of Files," by Lionello Lombardi, Proceedings of the Eastern Joint Computer Conference, pp. 137–141, Dec. 13–15, 1960.

Publication: BRL Report No. 1115, A Third Survey of Domestic Electronic Digital Computing Systems, by M. H. Weik, March 1961, page 370.

Publication: Programming the IBM 650 Magnetic Drum Computer and Data Processing Machine, by Richard V. Andree, Holt Rinehart and Winston, Inc., Publishers (copyright 1958).

Accordingly, the present invention is directed to a simple system of parallel-series switch-gate circuits for selecting by comparison desired information from a record storage. In accordance with the preferred embodiment of the invention, the record storage may be either a plurality of IBM cards, a storage tape having punched information provided thereon, or other record media in which perforations are provided to display the stored or recorded information thereon.

One application of the present invention is in selecting or retrieving information stored in a group of data records, whether the records are used to store statistical information, sales information, inventory information, fingerprinting information, or other types of records containing information which is generally unalterable in form.

The retrieval system of the present invention includes means for providing an alterable memory so that different and desired records may be selected or retrieved from the record storage. The memory means consists principally of selected contact means for providing a group of parallel paths in which the record means seeks to reduce the parallel conductive paths to a single or reduced number of parallel paths, so that these records that do provide the single or reduced number of parallel paths are thereby selected, while the remaining records which block the parallel paths from the memory circuits are not selected.

The invention also seeks to provide a novel information retrieval system in which a search record is placed within a search chamber of the information retrieval apparatus, and one of a plurality of punched records is individually applied to an interrogating chamber of the information retrieval apparatus. In the information retrieval apparatus are several series of parallel circuits, each parallel circuit comprising a fact group. The series arrangement of fact groups is embodied in brushes and conducting means which extend from the memory means through and between each of the said chambers so that the search record and the interrogating record may appropriately intervene between the brushes and the connecting means to selectively interrupt a portion or all of the parallel arrangement in each or all of the fact groups thereof.

Perhaps the outstanding advantage of the new information retrieval system is in its simplicity and economy of construction, as well as its adaptability to be changed from one set of series-parallel arrangements to another as may be desired.

A complete and further understanding of the invention may be had from the following description of particular embodiments of the invention. In the description, reference is made to the accompanying drawings of which:

Figures 1, 2:
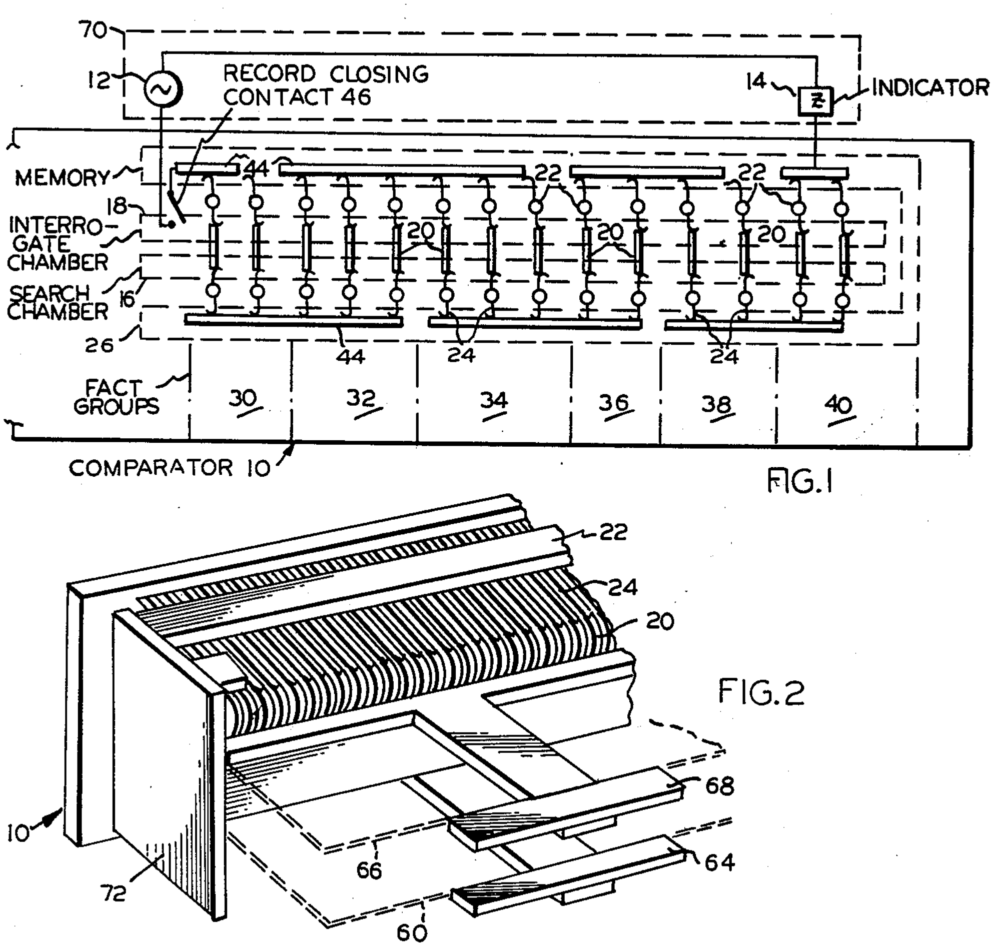
FIGURE 1 is a block and schematic diagram illustrating the elements of a preferred embodiment of the invention.
FIGURE 2 shows a portion of a perspective view of the comparator of a modified embodiment of the invention.

Referring now to the drawings, there is shown a record comparator 10, a source of current 12, and an alarm or indicator 14 connected in circuit as shown in FIG. 1, so that when the current from the source is applied to the comparator 10, and a comparison of records is made as will be described hereinbelow, an alarm or indication is provided for visual or aural indication by the indicator 14.

The comparator 10 includes a search chamber 16 and an interrogate chamber 18 for receiving data records, such data records being either perforated tape or perforated IBM type cards which are well known in the art. Extending between the search chamber and the interrogate chamber are conducting means 20 for providing a conductive path between the search chamber and the interrogate chamber. The conducting means are arranged between the chambers so that the conducting means are respectively positioned along a row and adjacent the perforations or holes in the record. The conducting means in a simple case may be a disc or button-shaped piece of copper or other highly conductive metal stamped from a sheet, or otherwise constructed to resemble a coin. The conducting means 20 are spatially oriented so that they are insulated from each other by a plastic material such as epoxy resin or the like, and, as is shown in FIG. 2, a portion of the conducting means 20 is tangentially engageable with a record that is received in the respective chambers. The perforations of the record overlie the conducting means and, as is shown in FIG. 1, brushes 24 are engageably mounted from a center position 22 so that the brush portion adjacent the conducting means is engageably oriented with the conducting means, while the distal end of the brush 24 engages and forms a fact-group memory 26 which extends about and peripherally of the interrogate chamber and the search chamber, as shown.

The conducting means 20 and the brushes 24 that form and relate to the search chamber 16 and the interrogate chamber 18 are positioned and arranged to form fact-groups 30, 32, 34, 36, 38, 40. The fact-groups 30, 36, 38, 40 are shown to include only two facts or bits, while fact-groups 32, 34 include three facts or bits.

The memory 26 includes contact elements 44 that connect the distal ends of the brushes 24 together. The connection may be either a contact means that is readily removable by displacement of the memory 26 from the comparator 10, or these distal ends of the brushes may be soldered together to form a predetermined and permanent connection for these brushes. It is noted that the brushes and conducting means 20 of each fact-group 30–40 comprise a group of parallel paths between upper and lower conducting elements 44. Also apparent from the illustration of the comparator 10 is the fact that each parallel arrangement of conducting means 20 and brushes 24 forming each fact-group is connected in series so that current from the source 12 will pass in series through each of the fact groups from left to right, for example, while current similarly passes through the parallel branches of each fact-group. A record closing contact 46 is shown to prevent current conduction through the fact-groups 30–40 until a record or IBM card means is applied to the interrogate chamber 18. The record closing contact may be similarly positioned in the search chamber 16 for accomplishing a corresponding result.

Figure 3:
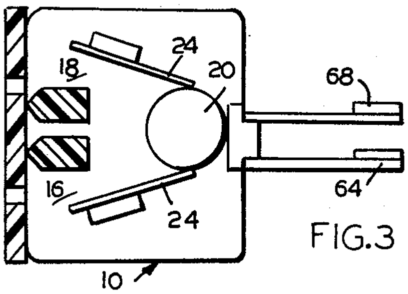
FIGURE 3 is an illustrative side view of the manner in which two records may be compared in accordance with the teachings of the present invention.

In the preferred embodiment of the invention, an IBM type record card 60 is placed in the search chamber 16 until the upper edge of the card engages a stop member 64 of the comparator 10. In this manner the card is passed over the brushes 24 of the search chamber. The brushes 24 are in alignment with the area of perforations or holes of the card 60 so that the brushes form a conductive path through the holes of the card. Similarly, an interrogate card 66, shown in dotted line of FIG. 2, is placed in the interrogate chamber 18, as shown in FIG. 3, until the upper edge of the card engages a stop element 68. Also similarly, the brushes 24 of the interrogate chamber 18 form a conductive path with the conducting means 20 where the brushes engage a hole of the record or card 66 as described above.

The search record or card 60 while in the search chamber 16, depending upon the relative positioning of the openings of the search card 60, will open or disengage the brushes 24 from the conducting means 20 in the search chamber 16. In this manner, a part of the parallel path of certain fact-groups will be open-circuited due to the lack of an opening in the card, while other brushes provide a closed circuit path through the fact-groups due to the brush extending through the opening of the card. Similarly, the card 66 in the interrogate chamber will open or close certain portions of the brush-conducting means 20 in the interrogate chamber so that the hole of the record provides a circuit path through the conducting means 20 where a hole in the interrogate card is present, and will eliminate a circuit path in the absence of such hole. If all of the parallel paths of any fact-group are incompleted due to the lack of a series circuit path through brushes and the conducting means, there will be no circuit path from the source 12 to the indicator 14. However, where there is at least the same positioning of openings in the interrogate card as there are in the search card, and there are at least one current path through each fact-group, there will be an indication of comparison on the indicator 14 so that it is apparent that the interrogate card has at least those openings for identifying information as are present on the search card.

Figure 4:
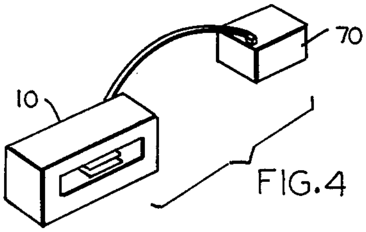
FIGURE 4 is an arrangement showing the compactness and simplicity of the embodiment of the entire invention.

The source 12 of current and the indicator 14 may be mounted in a cabinet 70, as shown in FIG. 4, that is electrically connected to the comparator 10.

FIG. 2 shows that the arrangement of conducting means 20 is separately arranged and positioned so that they are not in conductive relationship to each other since a plastic material may be secured therebetween to provide the separate conducting paths through each conducting means 20. The brushes 24 are mounted on the mounting 22 which is secured to side elements 72, one being shown in FIG. 2, which is secured to the cabinet of the comparator 10 as illustrated.

Figure 5:
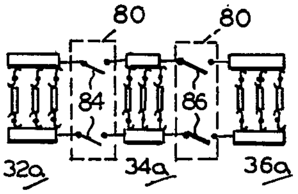
FIGURE 5 shows a further embodiment of the invention in which selective switch means are provided in the memory to alter the parallel-series arrangement of the comparator.

In FIG. 5 there is illustrated a modified memory having switch assemblies 80, 80 interposed between fact-groups *32a*, *34a*, *36a*. The switch assemblies include switch elements 84, 86 which may be selectively opened or closed to form or reform the fact-groups into more fact-groups having less bits, or into fewer fact-groups having more bits. More simply stated, the switches 84 may be both closed to form an increased number of bits of a fact-group, or may form only a single closed connection to link two fact-groups, as desired.

It is within the contemplation of the present invention to use any means for providing a circuitous or serpentine transmission path through one or more record cards, whether the serpentine transmission path to be a conductive electrical path as described above, or a light transmission path including photocells, mirrors, Lucite for piping light in a serpentine path, or other types of energy transmission means as are known to pass through opening of perforated records while the transmission is generally blocked by the solid portion of such records.

It is further within the contemplation of the present invention to provide switches in lieu of the brush-contact elements of the memory 26 so that the memory may be adjusted to store other information as desired and preset therein. Of course, the invention includes the use of IBM cards or other records including perforated tape, as well as conductive portions extending through celluloid film or other data and information storage media within the purview of the present invention.

It should be understood, however, that the specific apparatus herein illustrated and described is intended to be representative only, as many changes may be made therein without departing from the clear teachings of the invention. Accordingly, reference should be made to the folowing claims in determining the full scope of the invention.

What is claimed is:

1. Information retrieval apparatus for punched type records comprising a search chamber for inserting a punched record containing information to be searched, an interrogate chamber for inserting one of a plurality of punched records containing information to be retrieved upon comparison with said record in the search chamber, separately arranged conducting means between the search chamber and the interrogate chamber for each hole of the punched record, fact-group memory means including brush contacts forming a completed conductive path through a source of current and an indicator means from the interrogate chamber to the search chamber, said memory means connecting said conducting means and said brush contacts of each fact-group in a generally parallel arrangement, and further connecting each fact-group in a generally series arrangement, said record in the search chamber tending to reduce said parallel paths to a series path through the brush contacts, conducting means and memory means, and said record in the interrogate chamber completing the reduction of the parallel paths to said series path.

2. The invention of claim 1 wherein a record closing contact is provided in one of said chambers to prevent actuation of said indication means by said source in the absence of records in both said chambers.

3. The invention of claim 1 wherein the memory means may be adjusted to store other arrangements of fact-groups by providing switch means between adjacent brush contacts in the memory means to modify the number of fact-groups and to inversely modify the number of parallel paths of said fact-groups.

References Cited by the Examiner

UNITED STATES PATENTS

| | | | |
|---|---|---|---|
| 1,839,402 | 1/32 | Lorant | 73—156 |
| 2,156,979 | 5/39 | Gray | 73—156 |
| 2,971,057 | 2/61 | Olson et al. | 178—31 |
| 2,982,945 | 5/61 | Larsen | 73—156 X |

FOREIGN PATENTS

| | | |
|---|---|---|
| 1,000,677 | 10/51 | France. |

RICHARD C. QUEISSER, *Primary Examiner.*

DAVID SCHONBERG, *Examiner.*